(12) United States Patent
Virolainen et al.

(10) Patent No.: US 10,580,106 B2
(45) Date of Patent: Mar. 3, 2020

(54) GRAPHICS PROCESSING METHOD UTILIZING PREDEFINED RENDER CHUNKS

(71) Applicant: Basemark Oy, Helsinki (FI)

(72) Inventors: Teemu Virolainen, Helsinki (FI); Mikko Alaluusua, Helsinki (FI)

(73) Assignee: BASEMARK OY, Helsinki (FI)

( * ) Notice: Subject to any disclaimer, the term of this patent is extended or adjusted under 35 U.S.C. 154(b) by 0 days.

(21) Appl. No.: 15/907,313

(22) Filed: Feb. 28, 2018

(65) Prior Publication Data

US 2019/0266694 A1 Aug. 29, 2019

(51) Int. Cl.
*G06T 15/00* (2011.01)
*G06T 1/20* (2006.01)
*G06T 11/00* (2006.01)

(52) U.S. Cl.
CPC .............. *G06T 1/20* (2013.01); *G06T 11/001* (2013.01)

(58) Field of Classification Search
CPC ......... G06T 15/005; G06T 1/20; G06T 15/80; G06T 15/60; G06T 7/11; G06T 15/205; G06T 2207/20021; G09G 2360/122; G06F 8/41; G06F 9/5044
See application file for complete search history.

(56) References Cited

U.S. PATENT DOCUMENTS

| 2011/0199377 A1* | 8/2011 | Jang | G06T 15/005 345/426 |
| 2014/0354671 A1* | 12/2014 | Plowman | G06T 11/40 345/589 |
| 2018/0130253 A1* | 5/2018 | Hazel | G06T 15/005 |

* cited by examiner

*Primary Examiner* — Hau H Nguyen
(74) *Attorney, Agent, or Firm* — Jacob Eisenberg

(57) ABSTRACT

A method of rendering a frame on a display device can include the steps of loading a predefined render chunk, wherein said render chunk includes a render primitive for each object to be rendered in the frame, and wherein each render primitive includes a render element for each aspect of the object to be rendered in the frame, and wherein each render element includes assets to be used in rendering that aspect of the object, compiling a render set for each type of aspect to be rendered in the frame, wherein each render set includes all of the render elements from the render chunk which relate to that type of aspect to be rendered, executing a predefined render pipeline including a render routine for each type of aspect to be rendered, wherein the render sets are drawn on by the render routines during execution of the render pipeline, and displaying a rendered frame on the display device from the output of the executed render pipeline.

18 Claims, 5 Drawing Sheets

GRAPHICS PROCESSING METHOD UTILIZING PREDEFINED RENDER CHUNKS

FIELD OF INVENTION

The present invention relates to the field of visualization and rendering. In particular, the system deals with resource management and allocation within graphics engines. Furthermore, the system and methods allow for significant gains in speed, performance and reliability of computing devices, in particular Graphics Processing Units (GPUs).

BACKGROUND OF INVENTION

With current graphics engines resource allocation is not optimized for individual use cases, they essentially use pool memory which is use-case independent. For example, in an entertainment graphics engine some resources can be permanently allocated for rendering explosions regardless if there are any explosions in a given rendering set. As such, these resources may go to waste during large portions of gaming use and virtually always in, for example, industrial uses.

Additionally, current engines often hide their resource allocation so that it's hard to determine if certain operations results in new allocations.

Furthermore, to avoid having combinatorial explosion between algorithms configurations, certain resources are redundantly allocated. For example, one algorithm might need some temporary texture for intermediate results, but the texture is not needed after the algorithm completes, however, the texture is then kept just for that algorithm and is not accessible for other portions of the rendering pipeline thereby needlessly using system memory resources. Therefore, in current graphics engines this texture cannot be reused in a later stage or a different stage of the rendering pipeline.

A major problem created by current graphics engines system resource allocation is a high degree of memory fragmentation. Due to this, and on many other well known reasons in the art, current graphics engines are not well suited for safety critical environments.

SUMMARY OF THE INVENTION

It is an aspect of certain embodiments of the present invention to provide a novel method of rendering a frame on a display device.

Rendering methods can include loading a predefined render chunk, wherein said render chunk includes a render primitive for each object to be rendered in the frame, and wherein each render primitive includes a render element for each aspect of the object to be rendered in the frame, and wherein each render element includes assets to be used in rendering that aspect of the object. Loading a predefined render chunk can include loading, e.g. to a hard drive or other device memory, all of the assets and lists of the objects defined by the render chunk.

Render set can be compiled for each type of aspect to be rendered in the frame, wherein each render set can includes all of the render elements from the render chunk which relate to that type of aspect to be rendered. The compilation can be done pre-rendering and loaded into a renderer. Render sets can also, for example, be created on the fly from render chunks, groups of render chunks or dynamic render chunks.

Render pipelines can be predefined and executed which including a render routine for each type of aspect to be rendered, wherein the render sets are drawn on by the render routines during execution of the render pipeline.

Furthermore, there are disclosed herein methods for creating render chunks and render sets. An example method for creating a render chunk, for example a static render chunk, includes some or all of the following steps: defining a set of objects with the same lifetime to be rendered in at least one frame, defining a set of aspects to be rendered for each object, creating a render primitive for each of said objects, said render primitive having a render element for each aspect of the object to be rendered, said render elements having at least one asset associated therewith, creating a plurality of render sets containing render elements from multiple render primitives, wherein the render elements of a render set relate to the same aspect of an object to be rendered, and storing the render primitives and render sets in a computer readable medium prior to rendering.

Examples of render chunks described herein may include some or all of the following: a separate render primitive for each object to be displayed on the display device within the render chunk, wherein each render primitive includes at least one render element, wherein each render element relates to rendering one aspect of the object of the render primitive, and wherein each render element includes at least one asset related to the object of the render primitive, a plurality of render sets containing render elements from multiple render primitives, wherein the render elements of a render set relate to the same aspect of an object to be rendered, and wherein the render sets can be drawn on during rendering for rendering the associated aspect of the objects.

DETAILED DESCRIPTION OF EXEMPLARY EMBODIMENTS

As activities increasingly become digitalized and augmented with computer visualization there becomes a need for computer rendering methods which are more efficient and can process more data with less system resources. One way of addressing this is with the utilization of predefined render chunks, as will be described in more detail here.

Figure 1:
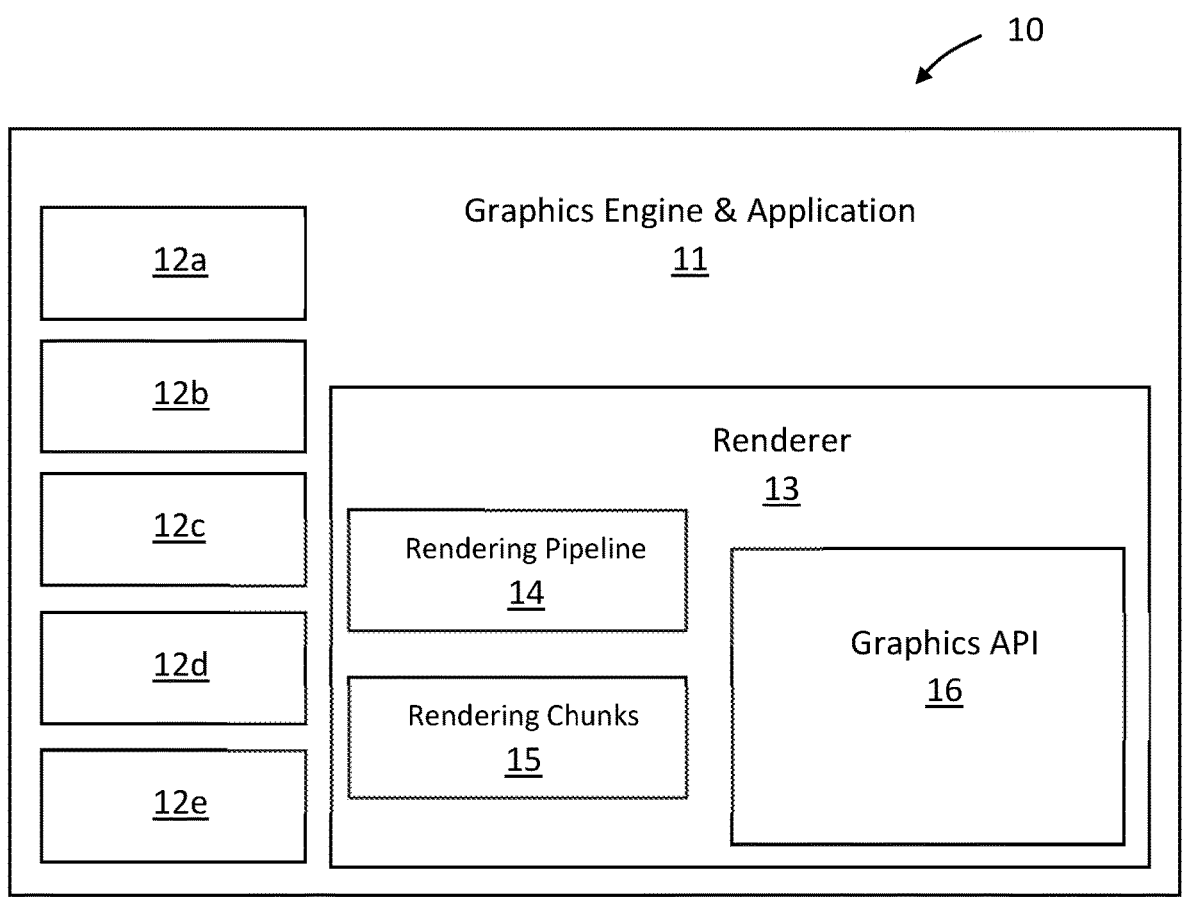
FIG. 1 shows an example graphics engine architecture.

FIG. 1 shows an example 10 graphics engine & application 11 architecture which utilizes the principles of render chunks. The Engine & application 11 may include several modules, for example one for animations 12a, a scene manager 12b, an input module 12c, application logic 12d and a user interface 12e. Within the engine is a renderer 13. The renderer can implement predefined rendering pipelines 14 utilizing predefined rendering chunks 15. The renderer can run with a graphics Application Programming Interface (API) 16. The graphics API can be platform independent and can be based on, for example, Vulkan or OpenGL.

Figure 2:
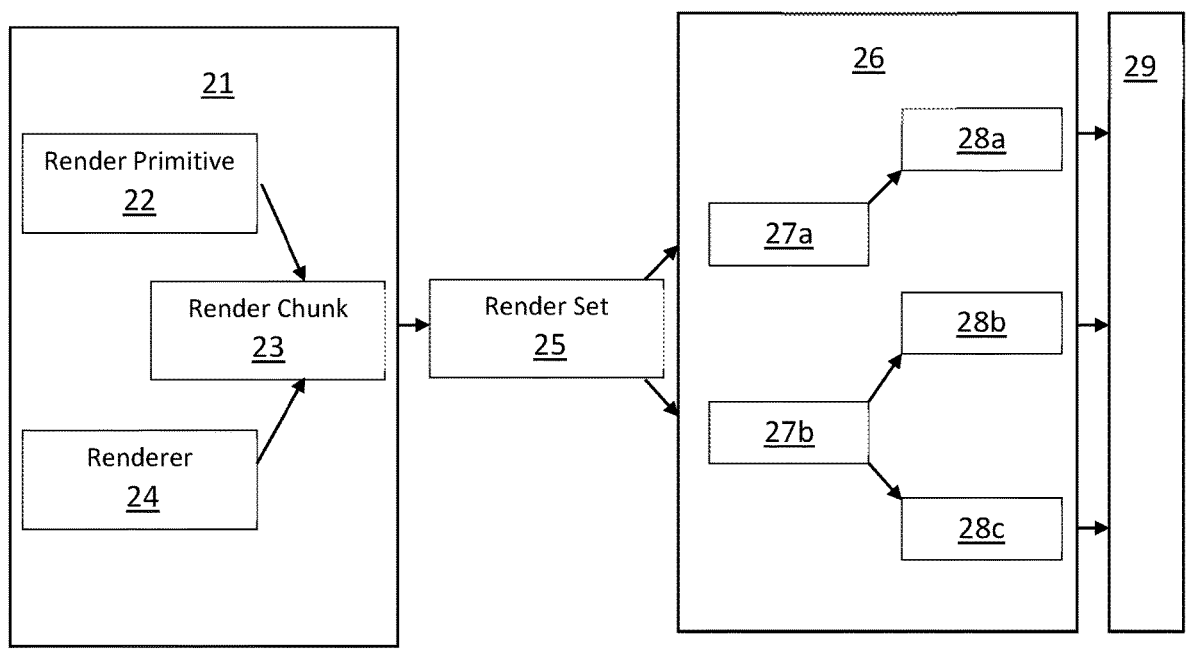
FIG. 2 shows an example renderer schematic.

FIG. 2 shows an example renderer schematic. For example this can be implemented as renderer 13 in the architecture of FIG. 1. According to certain examples, the renderer can be considered in two parts 21 and 26. Part 21 can be considered as what is visible outside of the renderer. This can include elements such as render primitives 22, render chunks 23, and portions of the pre-rendering portions of the renderer 24. Part 26 can be considered the rendering implementation portion with, for example, one or more rendering pipelines 27*a* and 27*b* which in turn each have one or more render routines 28*a*, 28*b* and 28*c*.

From part 21 of the renderer can be produced render chunks 23, as will be described in more detail herein. From a render chunk can be created one or more render sets 25. These render sets can then be called upon by, for example, render routines and/or render nodes within part 26. The output of part 26 can then be fed into a graphics API 29, similar to graphics API 16 in FIG. 1.

While parts 21 and 26 are described separately they can also be combined into a single portion of a renderer. Additionally, the creation of render sets can happen in connection with either part 21, part 26 or separately as an intermediate between the two parts.

According to certain implementations, the renderer can allocate render chunks. The render chunks can expose a collection of render primitives. The render primitives can be compiled into render sets. The render sets can contain render elements.

For example, a render primitive can be compiled into one or more render elements. A render primitive can define, for example, mesh, materials, transforms, bounds and other assets for a single object in a scene.

A render element can have, for example, one material, one mesh, one transform, or other element. A render element can also have all of the necessary assets for rendering a particular aspect of an object. For example, if an object is opaque and has a shadow caster material then there are two aspects of the object to be rendered. The object would have a single render primitive for the object with one render element for the opaque rendering aspect and another render element for the shadow caster material rendering aspect. Each of the render elements would have, for example, all of the information needed to render that aspect including, e.g. mesh, textures and other necessary and/or relevant information.

A render element, or as will be discussed below a render set, may be used by, drawn on or otherwise consumed within the execution of a render pipeline, for example by either a render routine and/or a render node.

As will be discussed in more detail with regards FIGS. 4 and 5, a render pipeline can be a chain of render routines, render nodes or a combination thereof. An example of a render routine is a rendering technique. For example, one render routine can be for rendering opaque objects. Other examples of rendering routines are for rendering transparent objects, shadow casters, post process effects or other rendering aspects. Render routines can be graphics API independent implementations of these rendering techniques.

A render pipeline can also define dependencies between render routines and render nodes. For example, a render routine for rendering the opaque aspect of an object might depend on a portion of, or the outcome of the shadow map render routine.

A render routine can consume one or more types of render sets. For example, an opaque render routine can consume render sets containing opaque materials, render elements for opaque rendering, render elements containing opaque materials or a combination thereof. Similarly, a shadow map render routine can consume render sets containing shadow caster materials, render elements for shadow casting rendering, render elements containing shadow caster materials or a combination thereof. As discussed here, a render routine 'consuming' can mean using as an input, drawing on, relying on or otherwise using some or all of the information thereof.

Figure 3:
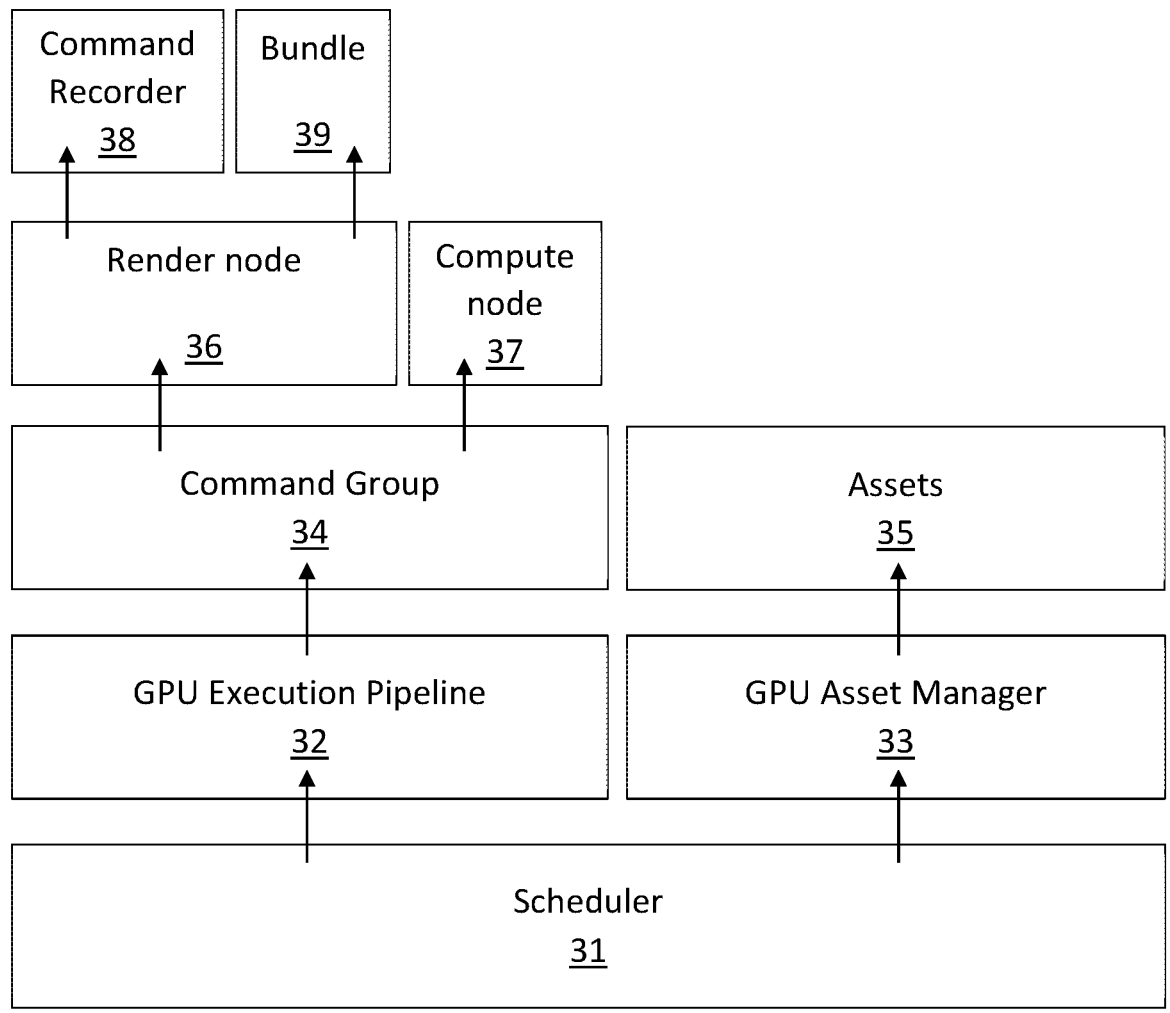
FIG. 3 shows an example platform independent graphics API.

FIG. 3 shows an example of a graphics API. The graphics API shown can be a platform independent graphics API.

A render node 36 can describe what kind of render targets it has and what other information it may need. A render node, as described in more detail below, can be, for example, a single work unit for a GPU or a single render pass. As an example, a render node can be a texture input for a shadow pass.

A command recorder 38 can be created from a render node. Command recorders 38 can contain additional information, for example about a GPU state, such as a blend mode. A command recorder 38 may record into a bundle 39. The bundle can be submitted to a render node 36. Multiple command recorders 38 can record into one or more bundles 39. A bundle may be a permanent bundle, a temporary bundle or a one time use bundle. For example, permanent bundles are efficient for rendering opaque objects. Additionally, permanent bundles can increase the rendering efficiency for long lived objects, e.g. objects which are rendered in a plurality of frames, and where the render, or draw order, does not change.

A recorded bundle is typically not changed after it has been recorded. For example, an object's position and/or culling may be changed but the draw order of the bundle isn't changed.

Compute nodes 37 can be similar to render nodes where render nodes are directed to work units in the rendering/visualization process and compute nodes are directed to computational work units. As described herein, features and uses described with regards to render nodes can also be applied to compute nodes herein.

The GPU execution pipeline 32 can include one or more command groups 34. Each command group can have, for example, a user specified callback. The user specified call back can be called for drawing multithreaded, for example. Callbacks may be called simultaneously. According to certain embodiments, no memory allocation is changed during callbacks. Furthermore, a command group may contain several nodes.

A command group may contain only render nodes, only compute nodes or a combination of render nodes and compute nodes. Command groups may contain not only information relevant to the GPU but it may also include CPU dependencies.

Within a command group 34 & GPU execution pipeline, render nodes 36 and/or compute nodes 37 may be sorted by dependency. This is described in more detail with regards FIGS. 4 and 5. Memory allocation, for example for temporaries such as frame buffers can be handled here. Additionally, render passes from render nodes can be created here. Furthermore, suitable passes can be merged here as one or more subpasses.

The scheduler 31 can contain a plurality of worker threads. These can be for callbacks, queue submission and the like. The scheduler can submit preprocessed command buffers from the GPU execution pipeline. The scheduler can issue barriers, e.g. system resource barriers, based on node graph dependencies, as will be discussed below. The scheduler may also split work across multiple queues, processors or threads.

In general, the scheduler can handle waiting for a new frame and calling the callbacks from the GPU execution pipeline. For example, on OpenGL there can be a single submission thread for command buffer implementation. The scheduler can send compute workloads to a CPU or other processor while scheduling the render nodes in a single thread for OpenGL.

The GPU asset manager 33 can handle resource allocation for a user as well as higher level asset management. For example, everything can be treated as an opaque handle. The GPU Asset manager can allocate on the level of a buffer which works as a uniform buffer.

Assets 35 can include material descriptors, material instances, meshes, textures and other art recognized assets.

As shown in FIG. 1, the engine and application can be segregated such that the renderer handles the functions described in FIGS. 2 and 3 while the application handles other tasks such as scene management, animations, audio, input, asset loader etc. By splitting work between core rendering work to be carried out within the renderer and other work to be carried out in an application format, a light weight graphics engine can be produced. This allows for increases in rendering efficiency for many utilizations.

A method of rendering a frame on a display device can comprise some or all of the following steps: loading a predefined render chunk, compiling one or more render sets, executing a predefined render pipeline and displaying a rendered frame.

A render chunk can include a render primitive for each object to be rendered in the frame. Each render primitive can include a render element for each aspect of the object to be rendered in the frame. Each render element can include assets to be used in rendering that aspect of the object. As discussed herein, examples of aspects of the object to be rendered can include opaque rendering, transparent rendering, shadow casting and other well known and art recognized aspects.

The render chunks can be predefined prior to rendering, for example prior to running or executing a rendering pipeline. These can be defined in the renderer or outside of the renderer, as shown in FIG. 2. For example, a user can create or define one or more render chunks in a pre-rendering and/or pre-release phase based on the known objects which will be rendered in a given frame in the future. These render chunks can then be stored in a non-transitory computer readable medium to be used in a rendering environment at a later date. Additionally, a render chunk can be created in a development phase and distributed to a plurality of end user devices to run the same render chunks during execution of a rendering pipeline.

Render chunks can be loaded into a local memory of a device which is connected to or associated with a display on which a scene is to be rendered. Render chunks may also be merely accessible to a device which is connected to or associated with a display on which a scene is to be rendered and used to create one or more render sets without the render chunk themselves being saved directly to the device.

Render chunks can be created in several ways. Render chunks can be created by carrying out some or all of the following steps: defining a complete set of objects to be rendered in at least one frame, defining a set of aspects to be rendered for each object, creating a render primitive for each of said objects, said render primitive having a render element for each aspect of the object to be rendered, said render elements having at least one asset associated therewith, creating a plurality of render sets containing render elements from multiple render primitives, wherein the render elements of a render set relate to the same aspect of an object to be rendered, and storing the render primitives and render sets in a computer readable medium prior to rendering.

An example of a render chunk comprises some or all of the following: a separate render primitive for each object to be displayed on the display device, wherein each render primitive includes at least one render element, wherein each render element relates to rendering one aspect of the object of the render primitive, and wherein each render element includes at least one asset related to the object of the render primitive, a plurality of render sets containing render elements from multiple render primitives, wherein the render elements of a render set relate to the same aspect of an object to be rendered, and wherein the render sets can be drawn on during rendering for rendering the associated aspect of the objects.

A render primitive of an object generally can contain all of the assets necessary for rendering the object itself. Such assets may include meshes, materials, transforms, bounds, animations, textures, or other art recognized assets.

A render chunk can contain a separate render primitive for each and every object to be displayed in a given frame. A render chunk can also contain only render primitives associated with objects to be rendered in a certain frame or set of frames.

The efficiency of the graphics engines described herein, and the rendering itself, can be increased with the use of the herein described render chunks. By defining all of the objects in a scene which is to be rendered in a single render chunk, the renderer does not need to search through, or utilize, irrelevant information. As an example, if a set of scenes involves a character walking through several rooms of a house, the house as a whole probably contains a large amount of objects and therefore a large amount of information. However, when in one room of a house, a character may not be able to see through an opaque wall into the next room. Old rendering techniques may have had to determine the field of view of the character, and then the status of the wall to determine if it needed to take into account the objects behind the wall in another room before it could finish, or even start, the rendering of the frame.

By using render chunks as described herein, if it is known that when in a first room the character can not see objects in another room, then one render chunk can be created for the first room the character is in and contain information only on the objects in that room. This reduces the amount of information the renderer needs to sift through and can increase the efficiency of the renderer. Another render chunk can be created for each room and when the character is in the new room, the new render chunk can be used in place of the earlier one. When bridging two spaces there may be a further render chunk with all of the objects of both rooms which is only used for a short amount of time while transitioning.

The present methods add additional efficiencies when certain scenes, and therefore certain render chunks, only contain objects requiring a limited amount of aspects to be rendered. Take for example two rooms in a house as described, the objects in the first room may be all opaque and some of the objects may have shadow caster materials. In the second room, there may also be some transparent objects. If there are no transparent objects in the first room then a render pipeline rendering the first room does not need to have a render routine for rendering a transparent aspect of the scene.

In certain scenarios the first room may have an associated first room render chunk, the second room may have a second room render chunk, and there may be a third render chunk for handling transitions. Furthermore, there may be a first render pipeline to be used with the first room and the first room render chunk that does not include a transparent render routine. In such a scenario there can be a second render pipeline to be used with the second room render chunk, and possibly the third render chunk, which includes the now necessary transparent render routine. Certainly, here it would be possible that a single render pipeline is used for all three render chunks and in which for some scenes the transparent render routine is essentially ignored, or otherwise takes minimal processing resources.

Where different render pipelines are used for different render chunks then the system resource allocation, as described below, for the different render pipelines can then be optimized. The efficiency gains according to these scenarios can be substantial, on the order of reducing system resources by a factor of 10 to 40 or more by being able to optimize the renderer, the render chunks or both for a given scene.

As such, the renderer may load, have stored, or have access to a set of different render chunks. The renderer may also only deal with a single render chunk, for example where all of the objects are constantly in the scene.

A render pipeline can thus be predefined and may or may not be limited to render routines, render nodes or a combination thereof which are to be used in rendering the objects of the render chunk. There can be a stored render pipeline associated with each render chunk or for a plurality of render chunks. There can also be stored system resource barriers and/or information relating to the allocation of Graphics Processing Unit (GPU) system resources for use with each stored render pipeline, a plurality of stored render pipelines, each stored render chunk, a plurality of render chunks or a combination thereof.

A render set is an aspect specific set of, for example, render elements. For example, if in a render chunk there are three aspects to be rendered; opaque, transparent and shadow caster, then there can be three associated render chunks, one for each aspect. A render set can be compiled from a render chunk. A render set can also be created directly from render primitives, render elements or simply the objects in a scene to be rendered. The render set for the given aspect can contain all of the render elements from a render chunk which relate to that type of aspect to be rendered.

A predefined render pipeline can contain a render routine(s) for each type of aspect to be rendered. A render routine for a given aspect, e.g. rendering opaque objects, can draw on or otherwise consume the render set(s) for opaque objects.

As discussed above, one predefined render pipeline and render chunk combination can be used to render multiple frames. Such frames can be consecutive or they can be separated by different rendering combinations of pipelines and render chunks. For example, where a new frame consists of the same objects to be rendered as the previous, or earlier frames, the same predefined render pipeline and predefined render chunk can be used for the plurality of frames.

Similarly, as discussed above, for a new frame having a different set of objects to be rendered compared to the previous, or earlier frames, a different render chunk, render pipeline or combination thereof can be utilized.

In any case, prior to executing a predefined render pipeline, a set of stored system resource barriers and/or information relating to the allocation of Graphics Processing Unit (GPU) system resources for rendering the frame on the display can be accessed, loaded, implemented or a combination thereof. Such set of stored system resource barriers and/or information relating to the allocation of GPU system resources can be associated with at least one predefined render chunk, at least one predefined render pipeline or a combination thereof.

GPU system resource allocation can be carried out prior to execution of the rendering pipeline and can be based on the set of rendering routines of the rendering pipeline and/or the contents of the render chunk to be rendered. GPU system resource allocation may not change from frame to frame of rendering when neither the predefined rendering pipeline nor the predefined render chunk changes.

Each render chunk may represent a scene having a constant set of objects. The objects may be static, dynamic or a combination thereof. The render chunk can then be used to render each frame of the scene with that constant set of objects. When the set of objects to be rendered changes a new predefined render chunk can be used for executing the same, or a different, predefined render pipeline for rendering the new set of objects There can also be an electronic device comprising some or all of; a graphics processing unit (GPU), an electronic display associated with the GPU, a graphics engine stored on a memory of the electronic device and having at least one render pipeline capable of producing an image on the electronic display based on at least one predefined render chunk, and a non-transitory computer readable medium of containing any combination of method steps described herein.

While the embodiments herein have been described as creating render sets from render chunks, it is conceivable that render sets can be created directly from render primitives and render elements without a discrete step of forming render chunks as such. It should be seen therefore, that the scope of the present invention also includes such scenarios where render sets are used as described herein without the actual creation of a render chunk. Similarly, render pipelines, render routines, render nodes or a combination thereof can call from the broader set of information within a render chunk without the finite step of creating a render set without departing from the scope of the invention described herein.

Aspect of what is disclosed herein can, for example, prevent memory fragmentation. As an example, a render chunk can be created from set of render primitives which are related. If the render chunk contains 100 objects, then it can have 100 draw calls. The lifetime of each render primitive in the render chunk can be the same.

According to certain example, a render chunk can be whole program. According to other examples, as described above, if the program is or includes a building, then each room can be have an associated render chunk. For streaming uses it is possible to move between chunks when the relations between the chunks are know.

The embodiments described herein can also be seen as content management within an engine or renderer. They can enable better streaming and memory management. This can be in part because it can be known prior to executing a render pipeline what resources are needed. Then it can be possible to take a linear segment for the whole process.

While a traditional rendering method may guess that certain objects live together, by using predefined render chunks there is no more guessing necessary which reduces system resource demands. The render chunks, and render sets can allow for making optimization with pre-recorded in common list(s) as the objects won't change.

According to certain embodiments there is only one render pipeline per application. A previous method may sort transparent and other objects each frame whereas with render sets the information can be given once and is good until it disappears. Render chunks can also allow physics to be reused for different aspects of an object, e.g. for shadow, opaque. One object in a render chuck, one render primitive, one render element or portions therefrom can be in used multiple render sets. It can also be possible to kill, delete, switch off or otherwise ignore one or more objects in a render chunk, without completely changing the entire render chunk, if one, or only a small portion of the objects from a scene become no longer relevant.

Render chunks, render sets, render primitives and render elements can be constructed as lists or lists of lists. For example, in OpenGL the display lists can be a command list and the render chunk can be constructed as a secondary command buffer. For example in Vulcan the architecture and methods herein allow for explicit threading as well.

According to certain embodiments described herein there are pre-defined rendering pipelines with predefined memory allocation. Graph building, resource allocation, and compiling of a pipeline can be used to determine the maximum resource need for a pre-defined rendering pipeline. This maximum resource need can then be sub-divided so that a minimum number of barriers need to be issued.

Predefined render chunks, predefined render pipelines or both can be pre-checked for errors prior to executing a render pipeline. As such, there does not need to be an error checking step during actual rendering. This in turn frees up system resources and increases performance. For example, the render chunks and/or render pipelines can be predefined, and optionally error checked, in development and pretested prior to a release mode. In release mode the predefined render chunks and/or predefined render pipelines need not be error checked or a simple error check can be used. In a run-time operation chunks may be created on the fly, for each frame, for each scene or as needed.

Additionally, render chunks can be used to increase efficiency in multi screen or divided screen rendering. E.g. for AR/VR heads up displays or where each eye has a separate display (3D) then instead of rendering each screen completely separately, each screen can reuse the same render chunks to speed up co-rendering.

While a single render chunk may include all of the objects of a certain scene, one scene may also have several render chunks. In a static render chunk, all of the objects in the render chunk have the same life span in the scene. Therefore, as long as one object in the render chunk is to be rendered, all of the objects in the chunk will also be rendered. In this manner, the system resource allocation can be managed efficiently so that larger blocks of memory can be allocated together and released together as the objects of the static render chunk essentially live and die together.

It is also possible to implement dynamic render chunks. Dynamic render chunks can be particularly useful in rendering, for example, user interfaces. A dynamic render chunk functions in the same manner as a static render chunk described above and has a fixed number of render primitives. However, the identities of the render primitives can change dynamically as needed. In a dynamic render chunk not all of the render primitives need to be populated with an actual object to be rendered. For example, a dynamic render chunk can include place holding generic render primitives.

For example, a dynamic render chunk can be created for 10 generic render primitives. Based on these 10 generic render primitives system resources can be allocated as a block. Then, between 1-10 objects can be loaded into the 10 generic render primitive slots of the dynamic render chunk. Render sets can then be compiled from the render primitives and render elements and implemented as discussed above.

These render sets can remain until one of the render primitives in the dynamic chunk changes. At that time, new render sets can be compiled with the updated render primitives of the render chunk.

A scene may contain multiple render chunks. A scene may contain both static and dynamic render chunks. The static render chunks can contain objects with the same life span for rendering and the dynamic render chunks can contain objects with different life spans for rendering.

An example of a node based resource allocation method follows herein. Additionally, U.S. application Ser. No. 15/803,873 "Graphics engine resource management and allocation system" is incorporated by reference herein in full. Each render node can define what it expects as an input and what it outputs.

Resources can be the required inputs and outputs of a render node or rendering algorithm. These can include data, data sets, scenes, parameters etc. that go into a rendering process of a render node.

A rendering node as described herein can be a process, routine, rendering pass or work unit which has dependencies. E.g. one pass of a shadow rendering algorithm or an orb glow rendering node for an object type. A sub-unit, e.g. a single work unit, of a larger rendering algorithm (e.g. a circle of confusion work unit within a depth of field rendering algorithm)

System resources can be, but are not limited to, GPU memory, CPU memory and processing capacity.

Rendering resources as described herein can be data sets either available to the graphic engine (e.g. textures) or data sets created within a rendering pipeline (e.g. light data from a light data calculation stage), memory cache requirement or processing requirements. Framebuffers System barriers can be, but are not limited to, cache flushing of memory (GPU, CPU, etc.), scheduling orders for when certain render algorithms/render nodes are to be or can be run, processing requirements for a certain rendering node/rendering algorithm or set thereof, indication of which rendering nodes/rendering algorithms are dependent upon on others, indication of which rendering nodes/rendering algorithms can share system resources, indication of which rendering nodes/rendering algorithms can be executed at the same time. System barriers can also be explicit commands issued to, or to be issued to, a processor, e.g. a GPU. An example of a system barrier is a command that everything which comes in before the barrier must finish before the next set of processes starts. Semaphores can be a system barrier.

By 'at the same time' it is generally meant that at a given time during rendering two or more distinct processes, e.g. render nodes and/or rendering algorithms, can be active. They may be running simultaneously where they both start and/or finish at the same time.

However, they also may be merely overlapping and where the two processes running at the same time can start and stop independently.

An acyclic graph can be created where the nodes of the acyclic graph are rendering algorithms and/or render nodes within a pipeline. For example, all of the work needed to be done by a GPU can be represented as nodes in an acyclic graph. Within an acyclic graph, the edges/links between the nodes of the acyclic graph can be the respective inputs and outputs of the rendering algorithms and/or render nodes. As discussed herein, an acyclic graph is typically a directed acyclic graph.

Figure 4:
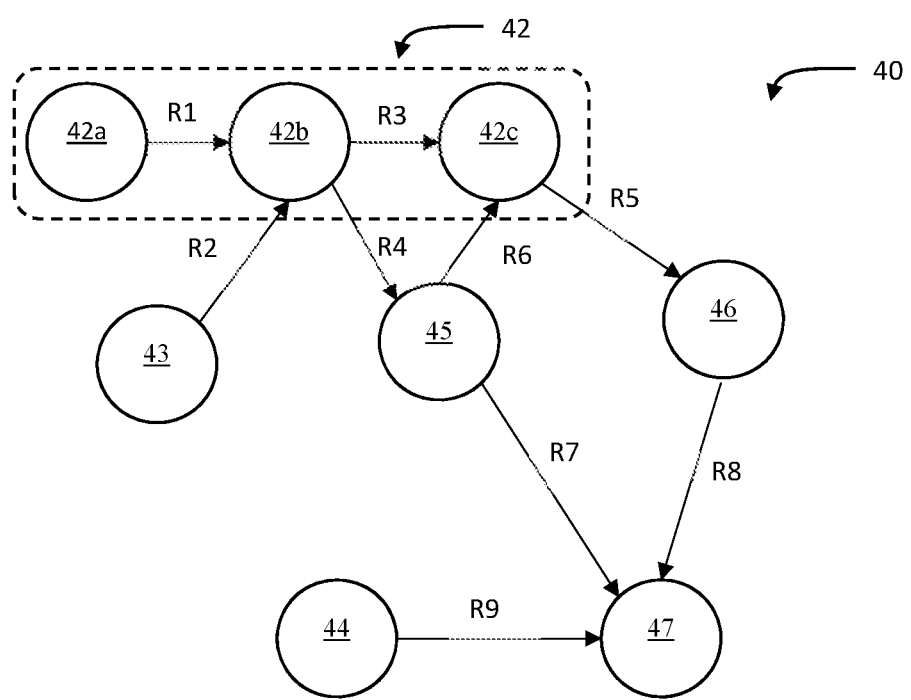
FIG. 4 shows an example acyclic graph of render routines and render nodes.

An example directed acyclic graph 40 of a simple render pipeline is shown in FIG. 4. The acyclic graph 40 includes a plurality of render nodes 42a-42c & 43-47. Each render node is a process which has defined inputs and outputs R1-R9. As shown in the example, there can be a render algorithm 42 which is composed of a series of render nodes 42a, 42b and 42c. The render algorithm can be subdivided as such based on the sub processes having different input and output requirements.

As can be seen from the graph 40, render node 42a outputs resource R1 which is an input for render node 42b. Render node 42b also requires the output R2 of render node 13. Render node 42b then outputs resources R3 and R4 which are inputs to render nodes 42c and 45 respectively. Resources R3 and R4 can be the same information and simply shown as two edges in the acyclic graph 40 as, while the information is the same, there are two distinct inputs. As well, the process of render node 42b can create two separate sets of data at the same time which are distinct outputs and distinct inputs.

Render nodes 43 and 45 for example can be essentially the same process and simply two distinct passes of that same process. Since the two passes of the same process will have different inputs and outputs, as seen from the graph, they can therefore be considered as separate render nodes within the render pipeline.

As can be seen from the directed graph, render nodes 42a-46 feed into final node 47 which is then capable of rendering the completed image. Any render pipeline can be described as these render nodes having distinct inputs and outputs. With this information the pipeline can be assembled into a similar acyclic graph.

An order of a rendering pipeline, e.g. a high level rendering pipeline, can be set based on an acyclic graph of the units. The units of the high level rendering pipeline can be render nodes, rendering algorithms of a combination thereof. The order can be set, for example, by carrying out a topological sort function on the acyclic graph. The outcome can then be an ordered single list of work units to be executed during rendering. Additionally, this list of work units can include the work units which can be carried out at the same time and/or information on which work units can be carried out at the same time. Such information can include information on which work units do not depend on, or need information from, certain others. Similarly, such information can include information on which work units require the same, or similar, resources.

Furthermore, based on the edges/links of an acyclic graph a set of system resource barriers can be defined. These barriers or information regarding these barriers can be stored within a rendering pipeline and/or can be accessible thereto. Therefore, these system resource barriers can be issued prior to, or during execution of a rendering pipeline to which they relate.

A liveness analysis can also be carried out based on an acyclic graph. From the liveness analysis memory allocation and/or memory cache flushing for an associated rendering pipeline can be determined. The memory allocation and/or memory cache flushing can thus be determined based on the resources described by the edges/links of the acyclic graph. Similarly, the memory allocation and/or memory cache flushing can thus be determined based on the inputs and outputs of render nodes and rendering algorithms. Therefore, memory can be allocated to a render node or rendering algorithm for only as long as needed while being executed.

The memory allocation and/or memory cache flushing, or information regarding that, can be stored within a rendering pipeline and/or can be accessible thereto. Therefore, memory can be partitioned, allocated and/or flushed prior to, or during execution of a rendering pipeline to which they relate.

Render nodes can be created separately from a broader rendering algorithm. For example, a high level rendering pipeline can contain a set of generic rendering algorithms, e.g. shadow map generation rendering algorithm, light data calculation rendering algorithm, opaque object rendering algorithm, etc. A user can then define one or more unique and/or additional render nodes. An example of a render node can be a specific glow around a certain object or object type. A render node can be considered as a specific work unit. A render node can also be considered to be defined by its inputs and outputs. For example, an orb glow render node can have the orb glow data for an object as its output and can have as its input light data, object position/orientation data and object surface texture data.

A render node defined by its inputs and outputs can be easily created by a user without detailed knowledge of a larger rendering pipeline or how the render node fits in. However, with defined inputs and outputs the render node can easily be added to an acyclic graph, for example an existing acyclic graph, and then sorted and integrated seamlessly within a rendering pipeline.

Additionally, a render node can be one pass of a rendering algorithm. A render node can also be several linked passes of one or more rendering algorithms. A render node can also be or include a rendering routine. For example, the sub-work unit takes a set of inputs, runs it through a routine, and produces an output. The routine can be simple or complex and can be predetermined or dynamic.

According to certain examples, information relating to memory requirements can be stored in and/or accessible to a lower level rendering pipeline. Thus, as an example, a high level rendering pipeline can define the order of work units (render nodes and/or rendering algorithms) to be carried out during rendering and a lower level pipeline can go through a rendering graph to determine minimal state transitions and associated memory requirements. Furthermore, as an example, a lower level rendering pipeline can determine to use more memory than minimally required in order to run multiple work units or render nodes at the same time. The information on which work units and/or render nodes can be run at the same time can be stored in and/or accessible to either of the high or low level rendering pipelines.

Additionally, while there is described herein a high/higher level rendering pipeline and a low/lower level rendering pipeline, any feature herein described in one level can be moved and/or copied to the other level. Furthermore, all of the features described herein can be combined into a single level rendering pipeline or dispersed in to one or more third rendering pipelines. Similarly, what is described herein as a high level rendering pipeline can be swapped into and/or simply be considered a low level rendering pipeline and vice versa.

The methods described herein can be run in real time or can be carried out prior to rendering. For example, the content and/or order of rendering pipelines, system resource barriers, memory allocation information or a combination thereof can be predetermined. During an execution of a program for displaying an image on a display device, the program/graphics engine can simply be issued or access the predetermined information and then carry out the final rendering.

Figure 5:
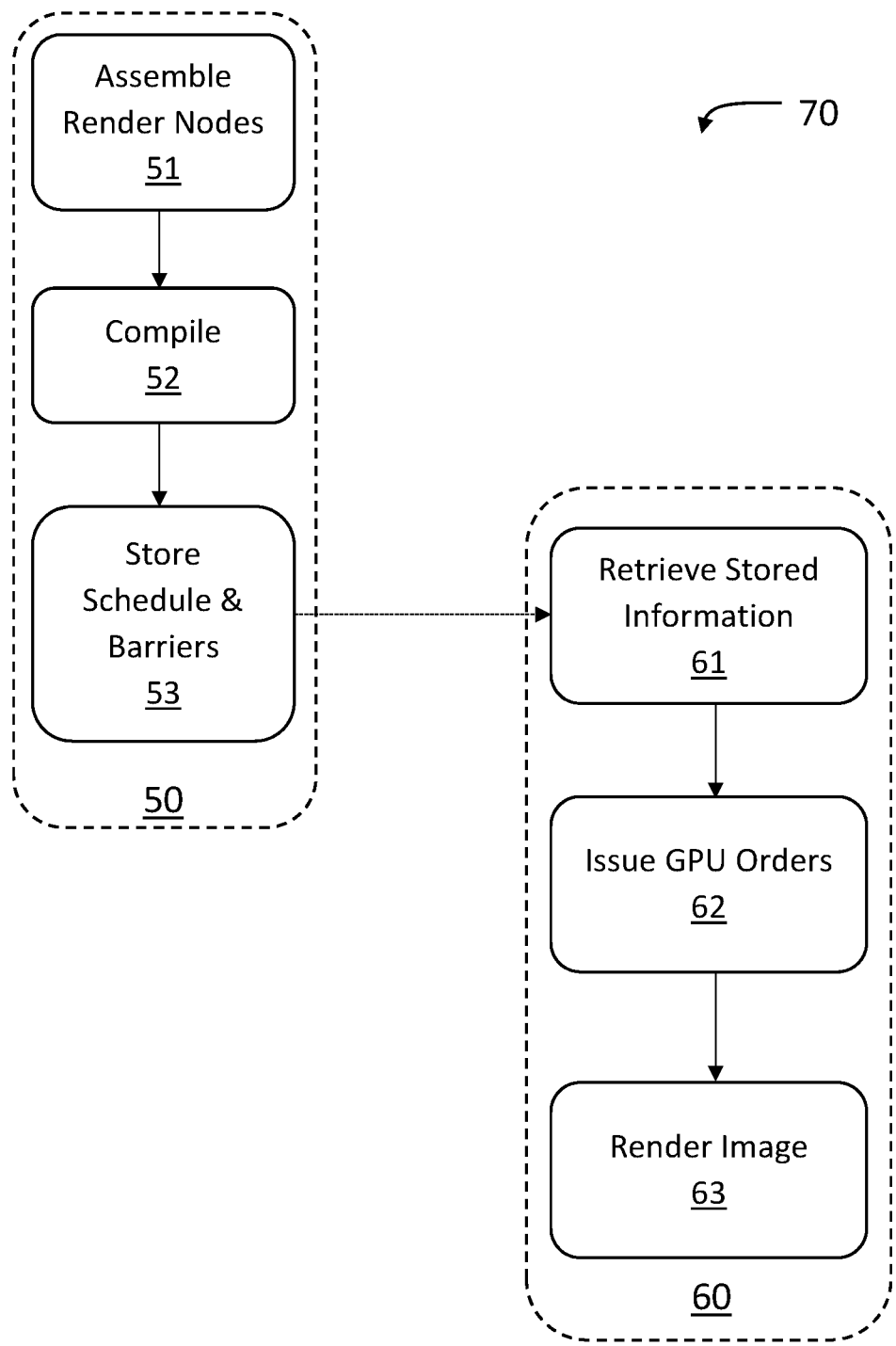
FIG. 5 shows an example resource allocation method.

FIG. 5 shows an example high level method 70 which implements the principles described herein. The high level method 70 can include two separate methods 50 and 60.

Method 50 as shown can be considered as a pre-processing stage. Method 50 can be carried out, for example, in pre-processing on a first device, host device or display device. Method 60 can be for example a rendering method on a display device. As such, methods 50 and 60 can be carried out on independent devices or on the same device. Additionally, steps within the two methods, or the two methods themselves, can run sequentially or parallel. Additionally, for example method 50 can be run once on a first device and then method 60 can be run later on multiple different display devices.

Method 50 describes a method for allocating resources for rendering. The method includes assembling 51 a plurality of render nodes. The render nodes can have their defined input(s) and output(s). From the assembled set of render nodes a schedule can be compiled 52. The compiled schedule for the plurality of rendering nodes can be based at least on the defined input(s) and output(s). Additionally, the plurality of rendering nodes can be scheduled such that more than one rendering algorithm can be carried out at a point in time. Within the compiling, a set of resource barriers can be defined. The set of resource barriers can include system resource barriers. These system resource barriers can be for processing the set of render nodes based on the created schedule.

The schedule and/or barriers can then be stored 53 in a memory of an electronic device. These can be stored prior to rendering, e.g. prior to carrying out the associated method 60 on a display device.

The information from method 50 can then be retrieved by a rendering process 30. Once the rendering process 60 is initiated, then based on the schedule and/or barriers orders can be issued 62 to a host device. The host device can be, or can include, a graphics processing unit (GPU). The host device can also be, or can include a central processing unit (CPU) or other whole or portion of a processing unit. Once the orders are carried out by the host device then a desired image is rendered 63.

Method 50, 60 or 70 can include creating a high level rendering pipeline and a lower level rendering pipeline. The high level rendering pipeline can includes said assembly 51 of rendering nodes and their dependencies. The lower level rendering pipeline can include the compiling 52 and created/stored schedule and barriers. The lower level pipeline can include determining minimal state transitions and/or memory requirements for each of the rendering nodes. Furthermore, the lower level pipeline can include the explicit orders and/or issuing 62 the explicit orders.

Essentially, the lower level pipeline can handle the actual resource allocation for the rendering. The high level rendering pipeline can thus contain the information about the processes and dependencies which require the resource allocation. For example, the high level rendering pipeline can define a chain of the rendering nodes which is capable of producing a desired rendered image or set of images. The lower level rendering pipeline can, among other things, then determine how many rendering nodes can be run parallel at the same time at a given point in time.

Creating a schedule and/or compiling can include creating the directed acyclic graph of the render nodes, their inputs and their respective outputs. Within the acyclic graph, the nodes can be render nodes and/or render algorithms. The edges between the nodes in the acyclic graph can be the dependencies between the render nodes based on the inputs and outputs of the render nodes.

Method 50 can further comprise, for example within compile step 52, topologically sorting an acyclic graph into a single list. The single list can be an order of render nodes which can be executed. An order can include dependencies between different render nodes including which render nodes or sets of render nodes can be executed independently of others.

System resource barriers can be defined based off of the edges from the acyclic graph, for example within compile step 52. A defined set of system resources can includes host device (e.g. CPU or GPU) resource requirements and/or allocation. For example, memory can be allocated for a render node for only the required amount of time for the render node. Rendering resources necessary as input for one render node can be kept in a memory cache and re-used for another render node. Additionally, for example when a resource is read-only, multiple render nodes utilizing the same or similar rendering resources and which are independent can be scheduled near each other to utilize the cached rendering resource.

Memory cache flushing instructions can be issued 62 for the cached rendering resource from the set of system resource barriers are issued, or scheduled to be issued, after the last render node which needs the same or similar rendering resource has output its product. Memory can be allocated and/or memory cache flushing instructions can be created based on a liveness analysis of the edges of an acyclic graph of the render nodes of a rendering pipeline. One example herein is graph coloring.

A benefit which arises from the present methods are that a user can define a process independently outside of a rendering engine/graphics engine. The process can then be set as a render node with resources which it needs to run. The render node can then be added to an existing render pipeline and/or set of render nodes. The new set of render nodes with the additional render node can then be re-compiled. In this manner, a developer can easily add, modify and remove small processes or sets of processes from a larger pipeline without needing to explicitly know themselves how those changes will affect the overall resource allocation of the rendering process. Therefore, a method 20 can further include defining a new render node, its required inputs and its required outputs, and adding the new render node to an existing render pipeline. The new render node can be added by adding the new render node to an acyclic graph of the existing render pipeline based on its required inputs and outputs and re-compiling to create a new schedule and set of system resource barriers based on the new set of render nodes.

Additionally, there can be an electronic device including a graphics processing unit (GPU), an electronic display associated with the GPU, an embedded graphics engine having a set of rendering algorithms for being carried out on the GPU to produce an image on the electronic display, and a non-transitory computer readable medium having stored thereon a set of predefined system resource barriers capable of being assigned to the GPU and a predefined scheduled order of the rendering algorithms for processing.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A non-transitory computer readable medium having stored thereon a set of instructions for carrying out the computer implemented method of rendering a frame on a display device, said method comprising the steps of:
loading a predefined render chunk which was defined prior to running or executing a render pipeline, wherein said render chunk includes a render primitive for each object to be rendered in the frame, and wherein each render primitive includes a render element for each aspect of the object to be rendered in the frame, and wherein each render element includes assets to be used in rendering that aspect of the object,
compiling a render set for each type of aspect to be rendered in the frame, wherein each render set includes all of the render elements from the render chunk which relate to that type of aspect to be rendered,
executing a predefined render pipeline including a render routine for each type of aspect to be rendered, wherein the render sets are drawn on by the render routines during execution of the render pipeline,
displaying a rendered frame on the display device from the output of the executed render pipeline, and
executing the predefined render pipeline to render at least one additional frame from the same loaded predefined render chunk, wherein the new frame consists of the same objects to be rendered as the earlier frame.

2. The non-transitory computer readable medium of claim 1, further comprising, for a new frame having a different set of objects to be rendered compared to an earlier frame;
loading an additional predefined render chunk, wherein said additional render chunk includes a render primitive for each object to be rendered in the new frame, and wherein each render primitive includes a render element for each aspect of the object to be rendered in the frame, and wherein each render element includes assets to be used in rendering that aspect of the object,
compiling a new render set for each type of aspect to be rendered in the frame, wherein each render set includes all of the render elements from the additional render chunk which relate to that type of aspect to be rendered,
executing a predefined render pipeline including a render routine for each type of aspect to be rendered, wherein the new render sets are drawn on by the render routines during execution of the render pipeline, and
displaying a new rendered frame on the display device from the output of the executed render pipeline.

3. The non-transitory computer readable medium of claim 2, wherein the predefined render pipeline for the original frame and the new frame is the same predefined render pipeline.

4. The non-transitory computer readable medium of claim 1, further comprising loading and implementing, prior to executing the predefined render pipeline, a set of stored system resource barriers and/or information relating to the allocation of Graphics Processing Unit (GPU) system resources for rendering the frame on the display.

5. The non-transitory computer readable medium of claim 4, wherein the set of stored system resource barriers and/or information relating to the allocation of GPU system resources is associated with at least one predefined render chunk.

6. The non-transitory computer readable medium of claim 1, wherein each render chunk represents a scene having a constant set of static and/or dynamic objects, and wherein said render chunk is used to render each frame of the scene with that constant set of objects.

7. The non-transitory computer readable medium of claim 6, wherein when the set of objects to be rendered changes a new predefined render chunk is used for executing the predefined render pipeline for rendering the new set of objects.

8. The non-transitory computer readable medium of claim 1, wherein GPU system resource allocation is carried out prior to execution of the rendering pipeline and is based on the set of rendering routines of the rendering pipeline and/or the contents of the render chunk to be rendered.

9. The non-transitory computer readable medium of claim 8, wherein GPU system resource allocation does not change from frame to frame of rendering when neither the predefined rendering pipeline nor the predefined render chunk changes.

10. A non-transitory computer readable medium having stored thereon a set of computer implementable instructions for causing the processor of a computing device to carry out the following steps prior to running or executing a render pipeline:

defining a set of objects with the same lifetime to be rendered in at least one frame, defining a set of aspects to be rendered for each object, creating a render primitive for each of said objects, said render primitive having a render element for each aspect of the object to be rendered, said render elements having at least one asset associated therewith, creating a plurality of render sets containing render elements from multiple render primitives, wherein the render elements of a render set relate to the same aspect of an object to be rendered, and storing the render primitives and render sets in a non-transitory computer readable medium prior to rendering, wherein the stored render primitives and sets are capable of being used in rendering multiple distinct frames in a render pipeline.

11. A non-transitory computer readable medium having stored thereon at least one render chunk for use in rendering objects on a display device, said render chunk being predefined prior to running or executing a render pipeline and comprising:

a separate render primitive for each object within the render chunk, wherein each render primitive includes at least one render element, wherein each render element relates to rendering one aspect of the Object of the render primitive, and wherein each render element includes at least one asset related to the object of the render primitive, a plurality of render sets containing render elements from multiple render primitives, wherein the render elements of a render set relate to the same aspect of an object to be rendered, wherein the render sets can be drawn on during rendering for rendering the associated aspect of the objects, and wherein a render chunk only contains render primitives associated with objects to be rendered in a certain frame or set of frames.

12. The non-transitory computer readable medium of claim 11, wherein the render primitive of an object contains all of the assets necessary for rendering the object.

13. The non-transitory computer readable medium of claim 11, wherein a render chunk only contains render primitives associated with objects to be rendered in a certain frame or set of frames.

14. The non-transitory computer readable medium of claim 11, further comprising a set of render chunks, wherein each stored render chunk includes a different set of render primitives, and where each render primitive of a render chunk is to be used when that render chunk is rendered for display on the display device.

15. The non-transitory computer readable medium of claim 11, wherein the render pipeline is predefined and is limited to render nodes which are to be used in rendering the objects of the render chunk.

16. The non-transitory computer readable medium of claim 11, further comprising a stored render pipeline associated with each render chunk.

17. The non-transitory computer readable medium of claim 11, further comprising stored system resource barriers and/or information relating to the allocation of Graphics Processing Unit (GPU) system resources for use with each stored render chunk.

18. The non-transitory computer readable medium of claim 11, wherein the assets of the set of render elements include meshes, materials, transforms, bounds, animations or textures.

* * * * *